(12) United States Patent
Min et al.

(10) Patent No.: US 9,671,541 B2
(45) Date of Patent: Jun. 6, 2017

(54) OPTICAL SHEET MODULE

(71) Applicant: LMS CO., LTD., Pyeongtaek-si, Gyeonggi-do (KR)

(72) Inventors: Jee Hong Min, Yongin-si (KR); Joon Hwan Hwang, Seoul (KR); Yong Shig Sim, Seoul (KR)

(73) Assignee: LMS CO., LTD., Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 14/655,336

(22) PCT Filed: Dec. 27, 2013

(86) PCT No.: PCT/KR2013/012239
§ 371 (c)(1),
(2) Date: Jun. 25, 2015

(87) PCT Pub. No.: WO2014/104772
PCT Pub. Date: Jul. 3, 2014

(65) Prior Publication Data
US 2015/0355396 A1  Dec. 10, 2015

(30) Foreign Application Priority Data
Dec. 27, 2012  (KR) .................. 10-2012-0154660

(51) Int. Cl.
*G02B 5/30* (2006.01)
*G02F 1/1335* (2006.01)
*G02B 5/02* (2006.01)

(52) U.S. Cl.
CPC ......... *G02B 5/3041* (2013.01); *G02B 5/0231* (2013.01); *G02B 5/3025* (2013.01);
(Continued)

(58) Field of Classification Search
CPC .. G02B 5/3041; G02B 5/0231; G02B 5/3025; G02B 6/0053; G02B 6/0056; G02F 1/133504; G02F 1/133536; B32B 3/30
(Continued)

(56) References Cited

U.S. PATENT DOCUMENTS

2004/0228106 A1* 11/2004 Stevenson .............. G02B 5/045
362/627
2005/0105014 A1* 5/2005 Hong ................ G02F 1/133615
349/65
(Continued)

FOREIGN PATENT DOCUMENTS

KR  10-2008-0039621 A  5/2008
KR  10-0867919 B1  11/2008
(Continued)

OTHER PUBLICATIONS

International Search Report for PCT/KR2013/012239 mailed Mar. 13, 2013 from Korean Intellectual Property Office.

*Primary Examiner* — Frank Font
(74) *Attorney, Agent, or Firm* — Revolution IP, PLLC

(57) ABSTRACT

Provided is an optical sheet module that includes: a first optical sheet that includes a first base substrate, and a first structurization pattern configured to refract light incident from the first base substrate in a normal direction; a second optical sheet that is formed above the first optical sheet, and includes a second base substrate and a second structurization pattern for refracting the light incident from the second base substrate in the normal direction and intersecting an extension direction of the pattern with an extension direction of the first structurization pattern; and a reflective polarizing sheet that is formed on the second optical sheet, reflects light polarized in the first direction to the lower portion, and transmits light polarized in the second direction to a display, wherein the first optical sheet and the second optical sheet are bonded to each other.

13 Claims, 7 Drawing Sheets

(52) U.S. Cl.
CPC ............... *G02F 1/133504* (2013.01); *G02F 2001/133507* (2013.01)

(58) Field of Classification Search
USPC .................. 359/485.01, 485.06; 349/96
See application file for complete search history.

(56) References Cited

U.S. PATENT DOCUMENTS

| | | | |
|---|---|---|---|
| 2006/0082698 A1* | 4/2006 | Ko ................ | G02F 1/133606 349/61 |
| 2010/0246021 A1 | 9/2010 | Sung | |
| 2010/0328579 A1 | 12/2010 | Shim et al. | |
| 2011/0051047 A1* | 3/2011 | O'Neill ............ | G02B 6/0096 349/67 |
| 2012/0113622 A1* | 5/2012 | Aronson ............ | G02B 5/02 362/97.1 |
| 2012/0307180 A1* | 12/2012 | Wang ............... | G02B 5/0215 349/64 |

FOREIGN PATENT DOCUMENTS

| | | |
|---|---|---|
| KR | 10-2010-0095926 A | 9/2010 |
| KR | 10-2012-0014460 A | 2/2012 |

* cited by examiner

*-Prior Art-*

OPTICAL SHEET MODULE

CROSS-REFERENCE TO RELATED APPLICATION

This Application is a National Stage Application of PCT International Patent Application No. PCT/KR2013/012239 filed on Dec. 27, 2013, under 35 U.S.C. §371, which claims priority to Korean Patent Application No. 10-2012-0154660 filed on Dec. 27, 2012, which are all hereby incorporated by reference in their entirety.

BACKGROUND OF THE INVENTION

Technical Field

The present invention relates to an optical sheet module. More particularly, it relates to an optical sheet module in which two optical sheets are integrally formed below a reflective polarizing sheet.

Background Art

A liquid crystal display device is a display device that is used in a notebook, a personal computer, a smart phone, a TV, or the like, and its properties have also been improved year by year according to the increasing demand for the liquid crystal display device.

A liquid crystal panel of the liquid crystal display device as a non-light emitting element requires a back light unit due to its structure. The back light unit is constituted by various optical systems. Further, the back light unit uses an optical film of a periodic arrangement in order to improve the brightness.

FIG. 1 is a diagram schematically illustrating a configuration of a liquid crystal display device that has been conventionally developed.

As illustrated in FIG. 1, aback light unit 10 includes a light-emitting source 1, a reflecting plate 3, a light guide plate 2, a diffusion sheet 4, a first optical sheet 5, a second optical sheet 6, and a reflective polarizing sheet 7.

The light-emitting source 1 is an element that generates visible light, and as the light sources 1, it is possible to selectively use a light emitting diode (LED), a cold cathode fluorescent (CCFL), or the like.

Light emitted from the light source 1 is incident on the light guide plate 2 and proceeds while causing the total reflection within the light guide plate 2, and since light incident on the surface of the light guide plate 2 at an incidence angle smaller than a critical angle is transmitted without being totally reflected, the light is emitted to the upper side and the lower side.

At this time, the reflecting plate 3 reflects the light emitted to the lower side and allows the light to enter the light guide plate 2 again, thereby improving the light efficiency.

The diffusion sheet 4 diffuses the light emitted through the top surface of the light guide plate 2 to provide uniform brightness and broaden a viewing angle, and brightness of the light passed through the diffusion sheet 4 is lowered in the vertical direction.

The first optical sheet 5 constituted by a base portion 5b and a structurization pattern 5a primarily condenses and releases the light incident from the diffusion sheet 4 so as to be refracted and vertically incident.

Further, the structurization pattern 5a is integrally formed on the upper surface of the base portion 5b, and has a structure for vertically refracting and emitting the light that is incident through the base portion 5b.

The structurization pattern 5a is generally formed so that its cross-section has a triangular shape, and an apex angle of the triangular shape is usually approximately 90 degrees.

Moreover, the second optical sheet 6 has the same shape as the first optical sheet 5, and secondarily condenses and releases the light that is primarily condensed by the first optical sheet 5 so as to increase the brightness of the light.

Here, the first optical sheet 5 and the second optical sheet 6 are disposed so as to further increase the brightness such that an extension direction of the structurization pattern of the first optical sheet 5 and an extension direction of the structurization pattern of the second optical sheet 6 intersect with each other at a right angle.

Moreover, the reflective polarizing sheet 7 is formed above the second optical sheet 6 to serve to transmit light polarized in the first direction of the light incident from the optical sheet 6 and reflect light polarized in the second direction. Meanwhile, reference numeral 8 in the drawings indicates a liquid crystal panel.

In the back light element of the configuration as described above, there has been a problem in which mountain grinding or the like of the structurization pattern due to the contact between the first optical sheet 5 and the second optical sheet 6 occurs to lower the quality of the display.

DISCLOSURE

Technical Problem

The present invention has been made to solve the problems of the conventional optical sheet module, and an aspect of the present invention provides an optical sheet module that can eliminate the conventional various problems, by integrally forming the two optical sheets formed below the reflective polarizing sheet into a single sheet.

Further, another aspect of the present invention provides an optical sheet module that can improve bonding quality and durability by increasing the bonding region and can minimize a decrease in luminance through the refraction of light at the bonding region.

Technical Solution

In order to solve the above problems, according to an aspect of the present invention, there is provided an optical sheet module including: a first optical sheet that includes a first base substrate and a first structurization pattern configured to refract light incident from the first base substrate in a normal direction; a second optical sheet that is formed above the first optical sheet and includes a second base substrate and a second structurization pattern for refracting the light incident from the second base substrate in the normal direction and intersecting an extension direction of the pattern with an extension direction of the first structurization pattern; and a reflective polarizing sheet that is formed on the second optical sheet, reflects light polarized in the first direction to the lower portion, and transmits light polarized in the second direction to a display, wherein the first optical sheet and the second optical sheet are bonded to each other.

It is preferred that an apex portion of the first structurization pattern of the first optical sheet be bonded to the second base substrate of the second optical sheet.

It is preferred that the first optical sheet and the second optical sheet be bonded to each other through an adhesive layer, and the apex portion of the first structurization pattern of the first optical sheet be buried in the interior of the adhesive layer.

It is preferred that the first structurization pattern has a light transmitting portion in which a cross-sectional area decreases as it goes to the upper portion, and a buried portion that is continuously connected to the upper portion of the light transmitting portion and is at least partially buried in the adhesive layer, and a peripheral length of a cross section in which the buried portion is in contact with the adhesive layer is formed to be greater than the periphery of a trajectory of a virtual cross section formed by upward extension of the light transmitting portion while having a continuous slope.

It is preferred that a bonding pattern having an uneven thickness of the cross section be formed on the lower surface of the second optical sheet, and a part of the first structurization pattern be bonded to the bonding pattern.

It is preferred that the thickness of the second base substrate be formed to be relatively thicker than the thickness of the first base substrate.

It is preferred that the second base substrate be greater than the first base substrate in relative flexural stiffness.

It is preferred that the second base substrate be material that has Young's modulus greater than the first base substrate.

It is preferred that a slope of a unit pattern of the first structurization pattern has a surface area that is relatively greater than a slope of the unit pattern of the second structurization pattern.

In the present invention, it is preferred that the second optical sheet be bonded to the reflective polarizing sheet.

It is preferred that the apex portion of the second structurization pattern of the second optical sheet be bonded to a rear surface of the reflective polarizing sheet.

It is preferred that the second optical sheet and the reflective polarizing sheet be bonded through the adhesive layer, and the apex portion of the second structurization pattern of the second optical sheet be buried in the interior of the adhesive layer.

It is preferred that the second structurization pattern has a light transmitting portion in which a cross-sectional area decreases as it goes to the upper portion, and a buried portion that is continuously connected to the upper portion of the light transmitting portion and is at least partially buried in the adhesive layer, and a peripheral length of a cross section in which the buried portion is in contact with the adhesive layer is formed to be greater than the periphery of a trajectory of a virtual cross section formed by upward extension of the light transmitting portion while having a continuous slope.

It is preferred that a bonding pattern having an uneven thickness of the cross section be formed on the rear surface of the reflective polarizing sheet, and a part of the second structurization pattern be bonded to the bonding pattern.

Advantageous Effect

According to the present invention for solving the above problems, there are following effects.

In the present invention, there are effects in which it is possible to provide a thin product by bonding the two optical sheets disposed below the reflective polarizing sheet, and it is possible to solve the problems such as mountain grinding of the apex portion of the structurization pattern generated by the contact between the conventional upper and lower optical sheets.

Further, according to the present invention, there are effects in which the structurization patterns buried into the interior of the adhesive layer provided between the upper optical sheet and the lower optical sheet to increase the bonding area with the adhesive layer, thereby improving the bonding quality by providing the maximum bonding area between the buried portion and the adhesive layer, and resulting in improvement in durability of the optical sheet module.

In particular, according to the present invention, by connecting the optical transmitting portion and the buried portion forming the structurization pattern provided in the lower optical sheet in the form of discontinuous slope, it is possible to maximize the bonding area being in contact with the adhesive layer, while maintaining the constant thickness of the adhesive layer.

BRIEF DESCRIPTION OF THE DRAWINGS

The above objects, other features and advantages of the present invention will become more apparent by describing the preferred embodiments thereof with reference to the accompanying drawings, in which.

PREFERRED EMBODIMENTS OF THE INVENTION

Figure 1:
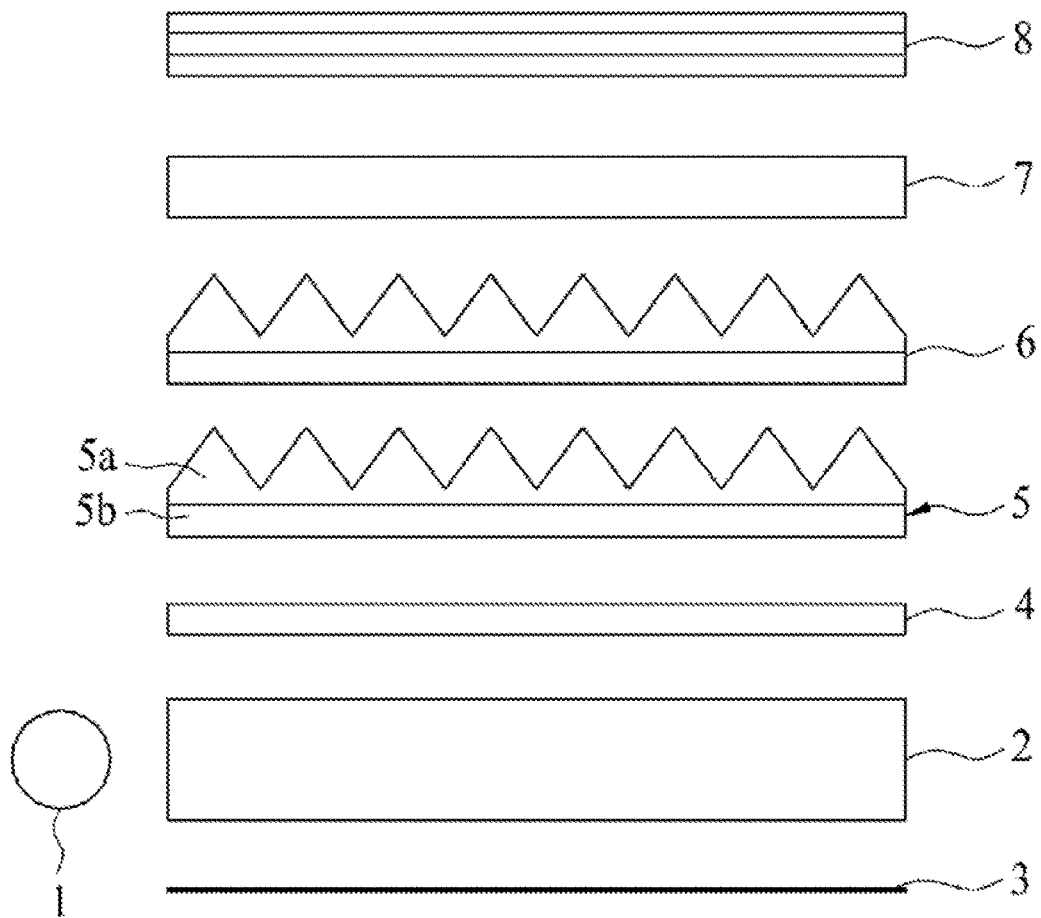
FIG. 1 is a diagram schematically illustrating a configuration of a liquid crystal display device that has been developed conventionally.

Preferred embodiments of the optical sheet module having the above-mentioned configuration according to the present invention will be described through accompanying drawings. However, this is not intended to limit the invention to the particular form but to assist the clearer understanding throughout the embodiments.

Moreover, in describing the present embodiment, the same configurations are used as the same names and the same reference numerals, and additional description of this will not be provided.

Figure 2:
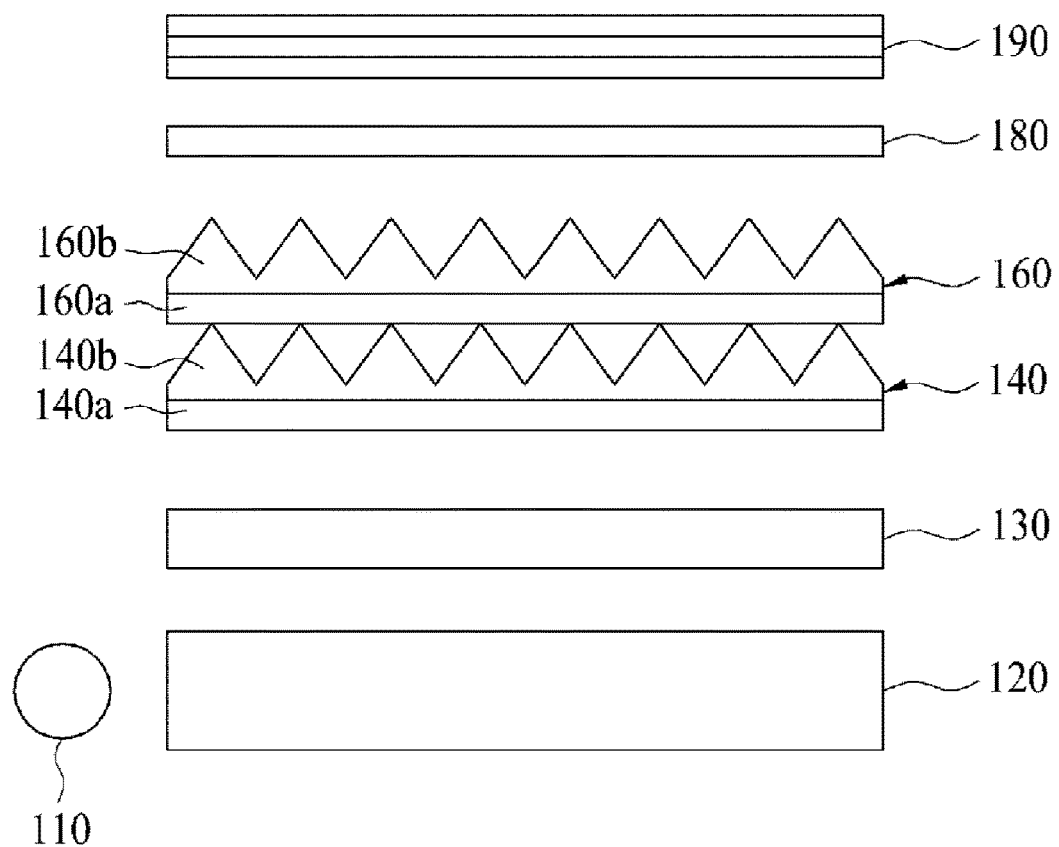
FIG. 2 is a cross-sectional schematic view of an optical sheet module according to an embodiment of the present invention.

First, the present invention will be described in detail referring to FIGS. 2 to 3. FIG. 2 is a cross-sectional schematic view of an optical sheet module according to an embodiment of the present invention, and FIGS. 3a and 3b are cross-sectional schematic views illustrating bonding between a second optical sheet and a first optical sheet that form an optical sheet module of the present invention.

As illustrated in FIG. 2, the present invention includes a first optical sheet 140; a second optical sheet 160 formed over the first optical sheet; and a reflective polarizing sheet transmits 180 that is formed over the second optical sheet 160 to reflect light polarized in a first direction to the lower part and transmit light polarized in a second direction, and the first optical sheet 140 and the second optical sheet 160 are bonded to each other. Moreover, a display device of the present invention may include a light source 110, a light guide plate 120, a diffusion sheet 130, and a liquid crystal panel 190 as in the normal case.

The light source 110 generally consists of a light emitter for emitting light, and emits light from the side portion of the light guide plate 120 and transmits light in the direction of the light guide plate 120.

Moreover, the light guide plate 120 changes light incident from the light source 110 in the form of a surface light source and transmits it in the direction of the diffusion sheet 130. The diffusion sheet 130 is disposed above the light guide plate 120, diffuses the light transferred from the light guide plate 120 and transmits the light to the upper part so as to evenly spread.

A first optical sheet 140 and a second optical sheet 160 are sequentially laminated over the diffusion sheet 130.

The light incident from the diffusion sheet 130 is refracted, collected, and emitted in a normal direction by a structurization pattern of the first optical sheet 140 and the second optical sheet 160 having such a configuration.

Meanwhile, the first optical sheet 140 is configured to include a first base substrate 140a and a first structurization pattern 140b, and the second optical sheet 160 is configured to include a second base substrate 160a and a second structurization pattern 160b.

The first base substrate 140a constituting the first optical sheet 140 transmits light transferred from the diffusion sheet 130 and transfers the light to the upper part, and the first structurization pattern 140b is formed on its upper surface. Light having passed through the first base substrate 140a is refracted and condensed, while passing through the first structurization pattern 140b, and is incident on the second optical sheet 160.

The first structurization pattern 140a protrudes upward on the upper surface of the first base substrate 140a and is formed such that the cross-sectional area decreases as it goes to the upper part. Thus, the light having passed through the first base substrate 140a is refracted, condensed, and transferred to the upper part.

The first optical sheet 140 configured in this way refracts and condenses the light transferred from the lower part by the first structurization pattern 140b, and emits the light to the upper part. In general, the first structurization pattern 140b is formed so that a prism having a triangular cross section extends in one direction, and a plurality of first structurization patterns 140b can be formed in an arranged form.

The second base substrate 160a constituting the second optical sheet 160 also transmits the light incident from the lower part and transfers it to the second structurization pattern 160b formed in the upper part, as in the first base substrate 140a. Then, the second structurization pattern 160b can be formed so that the cross-sectional area decreases as it goes to the upper part, similarly to the first structurization pattern 160b.

The first base substrate 140a and the second base substrate 160a are preferably made of material having high light transmittance such that the light transferred from the diffusion sheet 130 can be transmitted therethrough.

Moreover, the first structurization pattern 140b and the second structurization pattern 160b are arranged so that the extension direction of the pattern intersects with each other. At this time, an intersection angle between the first structurization pattern 140b and the second structurization pattern 160b can be applied as various angles, and in this embodiment, they are arranged to intersect each other at an angle of approximately 90 degrees.

In the present invention, it is preferred that the thickness of the second base substrate 160a forming the second optical sheet 160 be formed to be relatively thicker than the thickness of the first base substrate 140a. By providing such a difference in thickness, it is possible to reduce an occurrence of wrinkles when bonding the second optical sheet 160 on the top of the first optical sheet 140.

From this viewpoint, it is preferred that the second base substrate 160a has relative bending stiffness greater than the first base substrate 140a.

In general, when the material is elastically deformed, the material has nature that resists to the deformation, and a degree of resisting to the deformation is referred to as stiffness. Deformation when an external force is applied to the elastomer depends on the shape of the elastomer, the supporting method, the elastic modulus of materials, or the like, in addition to the magnitude of the forces and moments, and the stiffness of the material can be represented by the values of the external force for an amount of unit change. The curvature of the deflection curve of the beam when bending the beam is proportional to the bending moment M, and is inversely proportional to (the elastic modulus E)× (cross sectional secondary moment I). The curvature is great, as E×I is small even if the bending moment M is the same. That is, EI is a coefficient representing the magnitude of the curvature in the deflection curve, and this is referred to as flexural stiffness.

In the present invention, by controlling the bending stiffness as described above, it is possible to reduce an occurrence of wrinkles when bonding the first optical sheet 140 and the second optical sheet 160.

Further, it is preferred that the second base substrate 160a be made of material having Young's modulus greater than the first base substrate 140a. The Young's modulus refers to elastic modulus representing a degree of extension and a degree of deformation of the object, when stretching the object from both sides. By controlling Young's modulus as mentioned above, it is possible to reduce an occurrence of wrinkles when bonding the first optical sheet 140 and the second optical sheet 160.

Meanwhile, in the present invention, the first optical sheet 140 and the second optical sheet 160 are integrally bonded to each other to form a single module.

Figure 3A:
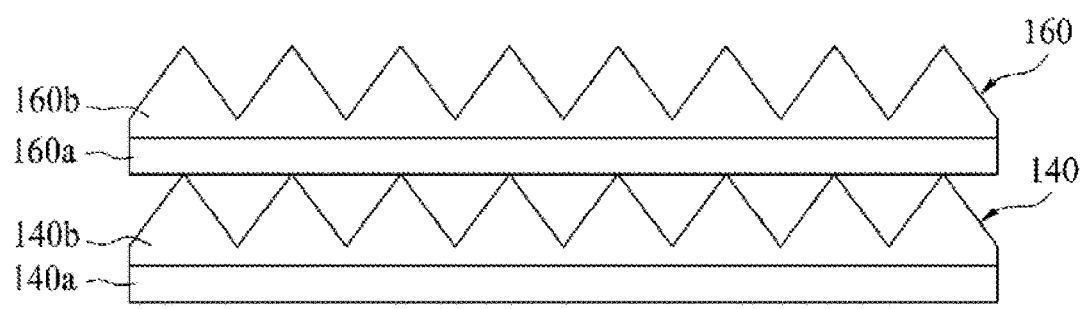
FIGS. 3A and 3B are cross-sectional schematic views illustrating bonding between an upper optical sheet and a lower optical sheet that form the optical sheet module of the present invention.
Figure 3B:
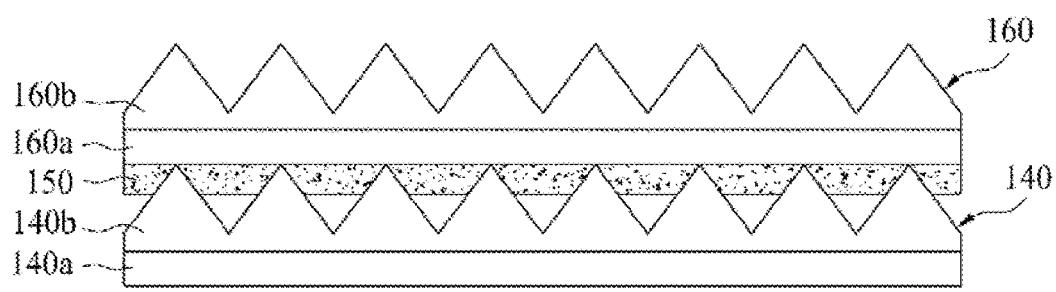

In FIG. 3a, as an example, the first structurization pattern 140b forming the first optical sheet 140 is bonded to the second base substrate 160a of the second optical sheet 160. The bonding method can be easily achieved by forming the first structurization pattern 140b by the adhesive component, and, for example, when using, for example, UV or heat curable adhesive, they can be easily bonded.

As another method, as illustrated in FIG. 3 b, the first optical sheet 140 and the second optical sheet 160 can be bonded through an adhesive layer 150, and the apex portion of the first structurization pattern 140b of the first optical sheet 140 can be buried in the interior of the adhesive layer 150.

Further, in the present invention, the slope of the unit pattern of the first structurization pattern 140b preferably has a surface area that is relatively greater than the slope of the unit pattern of the second structurization pattern 160b. The reason is that since the condensing area of light decreases due to the slope, which is buried into the adhesive layer 150 and disappears, of the slope of the first structurization pattern 140b forming the first optical sheet 140 when bonding the first optical sheet 140 and the second optical sheet 160, there is a need to adjust the area of the slope so as to compensate a decrease in the condensing area.

Figure 4:
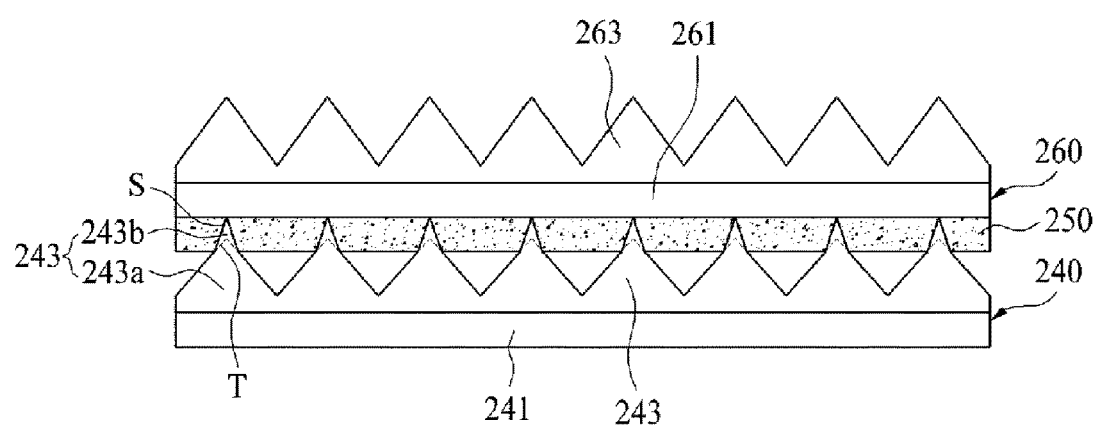
FIG. 4 is a cross-sectional schematic view illustrating bonding through the adhesive layer between the upper and lower optical sheets in another embodiment of the present invention.

FIG. 4 is a cross-sectional schematic view illustrating bonding through an adhesive layer between the upper and lower optical sheets of still another embodiment of the present invention.

As illustrated in FIG. 4, in the optical sheet module of the present invention, a first optical sheet 240 having a first base substrate 241 and a first structurization pattern 243 is boned to second optical sheet 260 having a second base substrate 261 and a second structurization pattern 263 through an adhesive layer 250.

Moreover, the first structurization pattern 243 is configured to include a light transmitting portion 243a in which a cross-sectional area decreases as it goes to the upper part, and an buried portion 243b that is continuously connected to the light transmitting portion 243a and is at least partially buried in the adhesive layer 250.

The light transmitting portion 243a is not buried in the adhesive layer 250 and is exposed to air to refract light transferred from the lower part and transfer the light to the upper part.

The buried portion 243b is connected to the upper portion of the light transmitting portion 243a, and the periphery of the cross section trajectory being in contact with the adhesive layer 250 can be formed to be greater than the periphery of a virtual cross section trajectory T in which the light transmitting portion 243a is formed to extend while having a consecutive slope.

The buried portion 243b can be formed in various forms, is equipped with a pair of extension surfaces S1 that extends upward from the light transmitting portion 243a so as to be inclined upward, and it can be formed so that upper ends of the extension surfaces S1 meet each other.

For this reason, in the present invention, the first structurization pattern 243 includes the light transmitting portion 243a in which cross-sectional area decreases as it goes to the upper part, and a buried portion 243b that is continuously connected to the upper portion of the light transmitting portion 243a and is at least partially buried in the adhesive layer 250, and the circumferential length of the cross section in which the buried portion 243b is in contact with the adhesive layer 250 is preferably formed to be greater than the periphery of a virtual cross section trajectory in which the light transmitting portion 243a is formed to extend upward while having a consecutive slope.

Thus, since the periphery of the buried portion 243b becomes greater than the periphery of the virtual cross section trajectory T of the light transmitting portion 243a, the area being in contact with the adhesive layer 250 becomes larger, whereby the bonding quality between the first optical sheet 240 and the second optical sheet 260 is improved.

Figure 5:
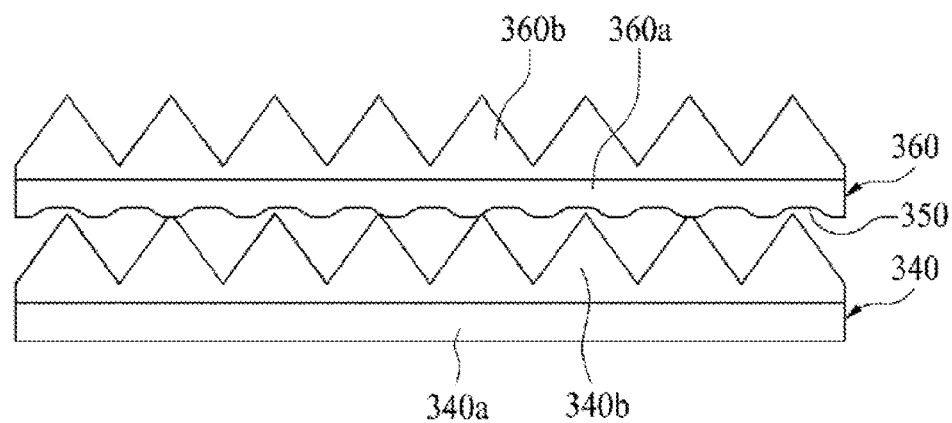
FIG. 5 is a cross-sectional schematic view illustrating bonding between the upper and lower optical sheets according to another embodiment of the present invention.

FIG. 5 is a schematic cross-sectional view illustrating bonding between the upper and lower optical sheets according to still another embodiment of the present invention.

As illustrated, the first optical sheet 340 includes a first structurization pattern 340b and a first base substrate 340a, and the first optical sheet 340 condenses the light transferred from the lower part and transfers the light to the second optical sheet 360.

The second optical sheet 360 includes a second structurization pattern 360b and a second base substrate 360a, and the second structurization pattern 360b refracts and condenses light transferred from the lower part. Moreover, the second base substrate 360a is formed with a bonding pattern 350 that is formed in the form of engraving.

The first optical sheet 340 is disposed to be laminated on the lower part of the second optical sheet 360, and the vertex portion of the first structurization pattern 340b is bonded to the bonding pattern 350.

Incidentally, since the bonding pattern 350 is formed on the same plane of the lower surface of the second base substrate 360a with different thicknesses, only a part of the first structurization pattern 340b is bonded to the lower surface of the bonding pattern 250.

In the case of forming the bonding pattern 350 on the lower surface of the second base substrate 360a, the second base substrate 360a has a uniform thickness and can separately form the bonding pattern 350 in the lower part. Although the drawings illustrate a case where the second base substrate 360a and the bonding pattern 350 are integrated, this is for the convenience of description, and the bonding pattern 350 is generally formed on the lower surface of the second base substrate 360a using UV or thermosetting resin.

When bonding the second optical sheet 360 and the first optical sheet 340, the apex portion of the first structurization pattern 340b can be bonded to the lower surface of the second base substrate 360a without using a separate adhesive, and at this time, the apex portion of the first structurization pattern 340b serves as an adhesive.

In this way, in the case of not using a separate adhesive, when the first structurization pattern 340b is bonded to the lower surface of the second base substrate 360a, it is bonded in a semi-cured state of not being completely cured. Therefore, when the vertex portion of the first structurization pattern 340b is in the process of being bonded to the lower surface of the second base substrate 360, the shape is deformed, a bonding area with the second base substrate 360a increases, and there is problem of a decrease in a slope for refracting light.

However, when forming the bonding pattern 350 as described above, only a partial unit pattern of the first structurization pattern 340b is bonded to the lower surface of the bonding pattern 360a. Therefore, when bonding the second base substrate 360a and the first structurization pattern 340b, since it is possible to reduce the number of unit patterns in which the apex portion of the first structurization pattern 340b disappears, it is possible to minimize the disappearance of the slope due to the deformation of the apex portion of the prism.

Furthermore, the optical sheet module of the present invention includes the reflective polarizing sheet 180 formed on the upper portion of the second optical sheet 160.

The reflective polarizing sheet 180 is formed so as to be able to reflect the light polarized in the first direction, of light incident from the second optical sheet 160, to the lower part and to transmit light polarized in the second direction to the display.

Figure 6:
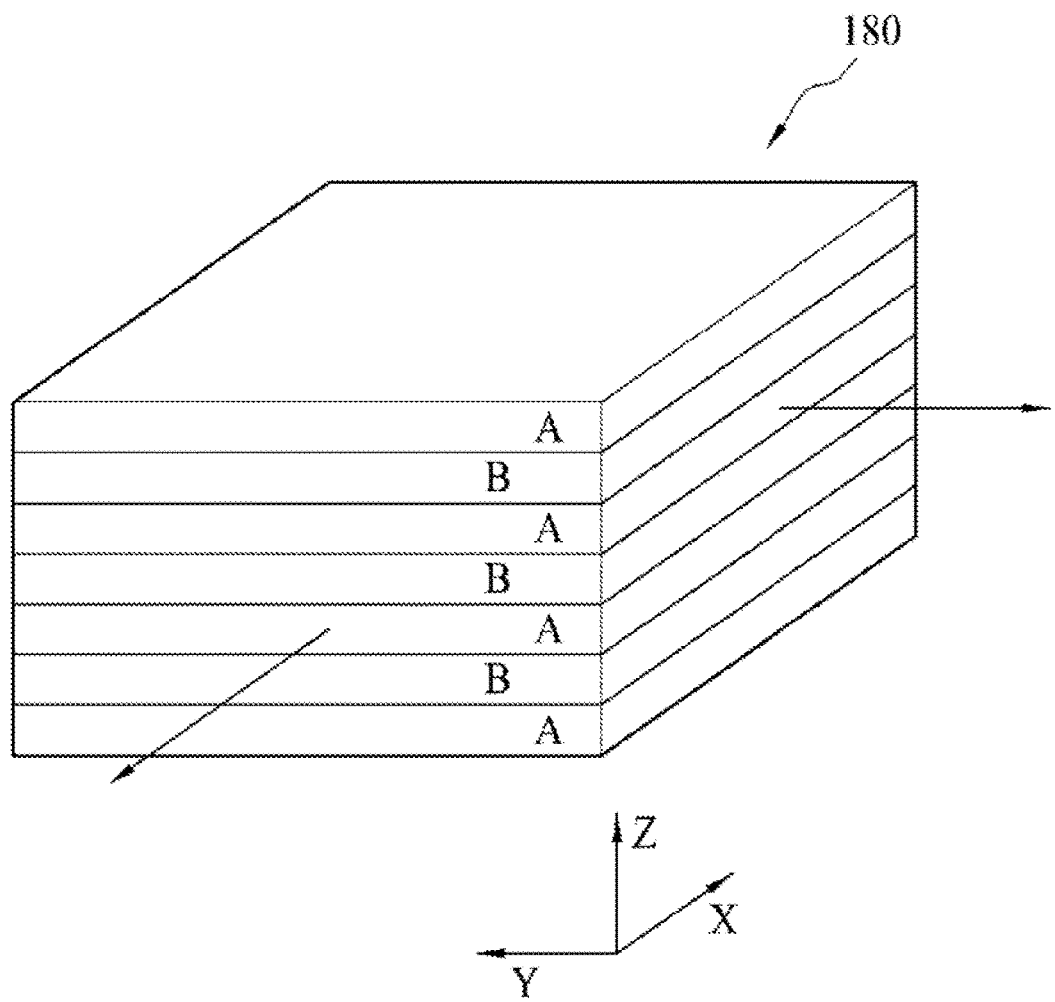
FIG. 6 is a diagram schematically illustrating a reflective polarizing sheet according to an embodiment of the present invention.

FIG. 6 is a diagram schematically illustrating such a reflective polarizing sheet 180.

The reflective polarizing sheet 180 is configured in the form in which two different polymeric materials (material A and material B) are alternately laminated. At this time, one material (e.g., material B) has characteristics in which a refractive index is not substantially changed even if it is stretched, and meanwhile, the other material (e.g., material A) has characteristics in which the refractive index changes in the direction of the stretching when it is stretched.

When stretching the laminated material along one axis (X-axis) in the state of laminating the material A and the material B, the laminated material is stretched in the X direction but is not significantly stretched in the Y-axis. As a result, the refractive index of the material A changes in the X direction, but the refractive index hardly changes in the Y direction in which the stretching does not greatly occur. Meanwhile, since the refractive index of the material B does not change even if it is stretched, the refractive index before stretching is maintained. At this time, when selecting the Material B to have the same refractive index as the refractive index in the Y direction of the Material A, although there is a difference in refractive index between the material A and the material B in the X direction, there is no difference in refractive index between the material A and the material B in the Y direction. As a result, light polarized in the X direction recognizes the difference in refractive index between the material A and the material B, but light polarized in the Y direction fails to recognize the difference in refractive index between the material A and the material B and is transmitted. Therefore, the reflective polarizing sheet 170 has the optional reflection characteristics that transmits light polarized in the first direction but reflects light polarized in the second direction.

In the present invention, the reflective polarizing sheet is disposed on the second optical sheets 160, 260, 360, and at this time, the reflective polarizing sheet can also be bonded to the second optical sheets 160, 260, 360.

Figure 7A:
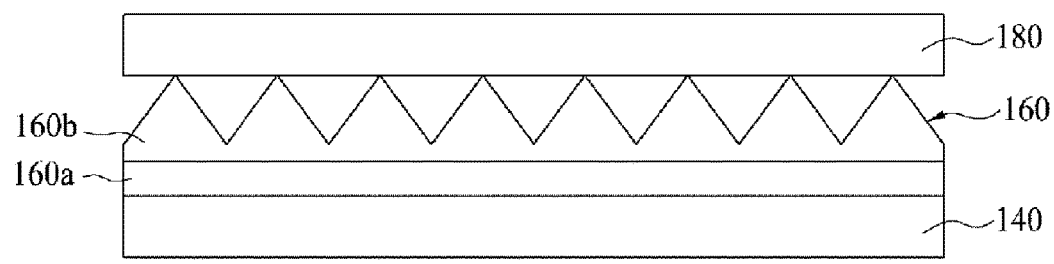
FIGS. 7a and 7b are cross-sectional schematic views illustrating bonding between the reflective polarizing sheet and the optical sheet according to an embodiment of the present invention.

FIG. 7A is a cross-sectional schematic view illustrating that the optical sheet and the reflective polarizing sheet according to an embodiment of the present invention are bonded to each other.

As illustrated in FIG. 7A, in this embodiment, the second structurization pattern 160b forming the second optical sheet 160 is formed of an adhesive component and is bonded to the upper reflective polarizing sheet 180. Moreover, the second optical sheet 160 can be bonded to the first optical sheet 140, by the method described in FIGS. 2 to 5.

Figure 7B:
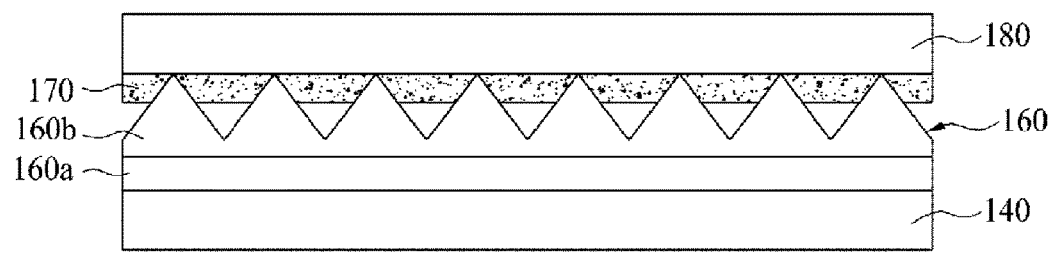

FIG. 7B is a cross-sectional schematic view illustrating that the optical sheet and the reflective polarizing sheet according to another embodiment of the present invention are bonded to each other.

In FIG. 7B, by forming an adhesive layer 170 on the lower surface of the reflective polarizing sheet 180, the second optical sheet 160 is bonded to the reflective polarizing sheet 180. In this case, the second structurization pattern 160b forming the second optical sheet 160 has a structure in which a part thereof is buried in the adhesive layer 150. Moreover, the second optical sheet 160 can be bonded to the first optical sheet 140 by the method described in FIGS. 2 to 5.

Figure 8:
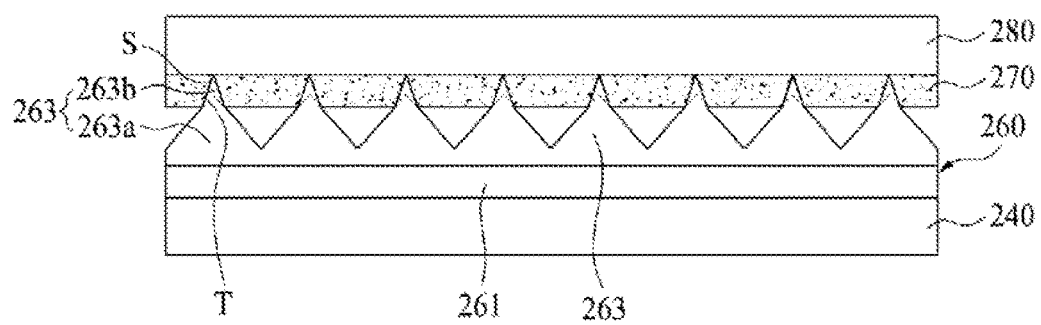
FIG. 8 is a cross-sectional schematic view illustrating bonding through the adhesive layer between the reflective polarizing sheet and the optical sheet in another embodiment of the present invention.

FIG. 8 is a cross-sectional schematic view illustrating that the optical sheet and the reflective polarizing sheet according to still another embodiment of the present invention are bonded to each other.

In FIG. 8, the second optical sheet 260 is bonded to the reflective polarizing sheet 280 through the adhesive layer 270. In this embodiment, the second optical sheet 260 is configured to include a base substrate 261 and a second structurization pattern 263. As illustrated, the second structurization pattern 263 is configured to include a light transmitting portion 263a in which a cross-sectional area decreases as it goes to the upper part, and a buried portion 263b that is continuously connected to the light transmitting portion 263a and at least partially buried in the bonding layer 270.

Furthermore, the buried portion 263b is connected to the upper portion of the light transmitting portion 263a, and the periphery of the cross section trajectory being in contact with the adhesive layer 270 can be formed to be greater than the periphery of the virtual cross section trajectory T formed by the extension of the light transmitting portion 263a while having the consecutive slope.

Moreover, the second optical sheet 260 can be bonded to the first optical sheet 240, by the method described in FIGS. 2 to 5.

Figure 9:
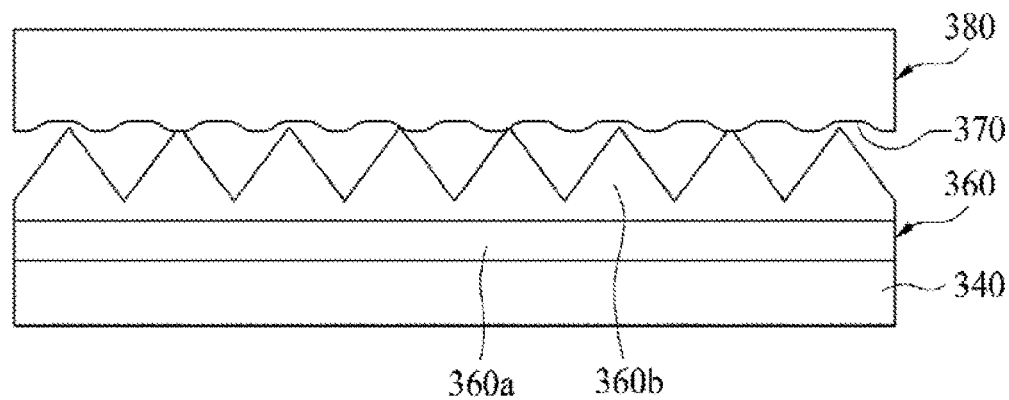
FIG. 9 is a cross-sectional schematic view illustrating bonding between the reflective polarizing sheet and the optical sheet according to another embodiment of the present invention.

FIG. 9 is a cross-sectional schematic view illustrating that the optical sheet and the reflective polarizing sheet according to still another embodiment of the present invention are boded to each other.

As illustrated, in this embodiment, a bonding pattern 370 having a non-uniform thickness formed in the shape of engraving is formed on the rear surface of the reflective polarizing sheet 380. Moreover, the second optical sheet 360 is disposed below the reflection polarizing sheet 380, and the second optical sheet 360 includes a second structurization pattern 360b and a second base substrate 360a.

Therefore, when laminating both sheets each other, the apex portion of the second structurization pattern 360b of the second optical sheet 360 is bonded to the bonding pattern 370.

Moreover, the second optical sheet 360 can be bonded to the first optical sheet 340 by the method described in FIGS. 2 to 5.

As described above, although preferred embodiments of the present invention have been described, in addition to the embodiments described above, the present invention may be embodied in other forms without departing from the spirit or category of the present invention. Therefore, this embodiment should be considered to be illustrative rather than restrictive to the specific forms, and thus, the present invention can also be varied within the scope of the category of the appended claims and their equivalents, without being limited to the above-mentioned description.

What is claimed is:

1. An optical sheet module comprising:
   a first optical sheet that includes a first base substrate, and a first structurization pattern configured to refract light incident from the first base substrate in a normal direction;
   a second optical sheet that is formed on the first optical sheet, and includes a second base substrate and a second structurization pattern which refracts the light incident from the second base substrate in the normal direction and intersects an extension direction of the second structurization pattern with an extension direction of the first structurization pattern, wherein a thickness of the second base substrate is formed to be relatively thicker than the thickness of the first base substrate; and a reflective polarizing sheet that is formed on the second optical sheet, reflects light polarized in a first direction to a lower portion, and transmits light polarized in a second direction to a display, wherein the first optical sheet and the second optical sheet are bonded to each other.

2. The optical sheet module of claim 1, wherein an apex portion of the first structurization pattern of the first optical sheet is bonded to the second base substrate of the second optical sheet.

3. The optical sheet module of claim 1, wherein the first optical sheet and the second optical sheet are bonded to each other through an adhesive layer, and the apex portion of the first structurization pattern of the first optical sheet is buried in the interior of the adhesive layer.

4. The optical sheet module of claim 3, wherein the first structurization pattern has a light transmitting portion in which a cross-sectional area decreases as it goes to the upper portion, and a buried portion that is continuously connected to the upper portion of the light transmitting portion and is at least partially buried in the adhesive layer, and a peripheral length of a cross section in which the buried portion is in contact with the adhesive layer is formed to be greater than the periphery of a trajectory of a virtual cross section formed by upward extension of the light transmitting portion while having a continuous slope.

5. The optical sheet module of claim 1, wherein a bonding pattern having an uneven thickness of a cross section is formed on the lower surface of the second optical sheet, and a part of the first structurization pattern is bonded to the bonding pattern.

6. The optical sheet module of claim 1, wherein the second base substrate is greater than the first base substrate in relative flexural stiffness.

7. The optical sheet module of claim 1, wherein the second base substrate is a material that has Young's modulus greater than the first base substrate.

8. The optical sheet module of claim 1, wherein a slope of a unit pattern of the first structurization pattern has a surface area that is relatively greater than a slope of the unit pattern of the second structurization pattern.

9. The optical sheet module of claim 1, wherein the second optical sheet is bonded to the reflective polarizing sheet.

10. The optical sheet module of claim 9, wherein the apex portion of the second structurization pattern of the second optical sheet is bonded to a rear surface of the reflective polarizing sheet.

11. The optical sheet module of claim 9, wherein the second optical sheet and the reflective polarizing sheet are bonded through the adhesive layer, and the apex portion of the second structurization pattern of the second optical sheet is buried in the interior of the adhesive layer.

12. The optical sheet module of claim 11, wherein the second structurization pattern has a light transmitting portion in which a cross-sectional area decreases as it goes to the upper portion, and a buried portion that is continuously connected to the upper portion of the light transmitting portion and is at least partially buried in the adhesive layer, and a periphery length of a cross section in which the buried portion is in contact with the adhesive layer is formed to be greater than a periphery of a trajectory of a virtual cross section formed by upward extension of the light transmitting portion having a continuous slope.

13. The optical sheet module of claim 9, wherein a bonding pattern having an uneven thickness of the cross section is formed on the rear surface of the reflective polarizing sheet, and a part of the second structurization pattern is bonded to the bonding pattern.

* * * * *